United States Patent
Martinez Canedo et al.

(10) Patent No.: US 9,417,930 B2
(45) Date of Patent: Aug. 16, 2016

(54) TIME SLACK APPLICATION PIPELINE BALANCING FOR MULTI/MANY-CORE PLCS

(71) Applicant: Siemens Corporation, Orlando, FL (US)

(72) Inventors: Arquimedes Martinez Canedo, Princeton, NJ (US); Thomas Feichtinger, Monmouth Junction, NJ (US); Mohammad Abdullah Al Faruque, Irvine, CA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/394,395

(22) PCT Filed: Apr. 19, 2013

(86) PCT No.: PCT/US2013/037327
§ 371 (c)(1),
(2) Date: Oct. 14, 2014

(87) PCT Pub. No.: WO2013/158968
PCT Pub. Date: Oct. 24, 2013

(65) Prior Publication Data
US 2015/0121396 A1    Apr. 30, 2015

Related U.S. Application Data

(60) Provisional application No. 61/635,355, filed on Apr. 19, 2012.

(51) Int. Cl.
*G06F 17/50*    (2006.01)
*G06F 9/48*     (2006.01)
*G06F 9/50*     (2006.01)
*G06F 9/45*     (2006.01)

(52) U.S. Cl.
CPC ............ *G06F 9/5083* (2013.01); *G06F 8/4452* (2013.01); *G06F 9/4881* (2013.01)

(58) Field of Classification Search
CPC ............................. G06F 9/5083; G06F 9/4881
USPC .......................................................... 716/134
See application file for complete search history.

(56) References Cited

U.S. PATENT DOCUMENTS

| | | | | |
|---|---|---|---|---|
| 6,826,677 | B2 * | 11/2004 | Topham | G06F 8/441 |
| | | | | 712/216 |
| 7,302,685 | B2 * | 11/2007 | Binns et al. | G06F 9/4887 |
| | | | | 370/415 |
| 2002/0120661 | A1 | 8/2002 | Larson | |
| 2002/0144092 | A1 | 10/2002 | Livesley | |

FOREIGN PATENT DOCUMENTS

| | | | |
|---|---|---|---|
| EP | 1531390 A2 | 5/2005 | |
| WO | 02054238 A2 | 7/2002 | |

* cited by examiner

*Primary Examiner* — Sun Lin

(57) ABSTRACT

A method for performing time-slack pipeline balancing for multi/many-core programmable logic controllers includes performing a runtime analysis of a plurality of pipeline stages of a program for a multi/many-core programmable logic controller (PLC) while the program is being executed, and of a plurality of system services, to compile a profile of performance statistics of the PLC program and the system services, calculating a time slack for each of the plurality of pipeline stages of the PLC program using the profile of performance statistics, and for all pipeline stages except a longest stage, donating the time slack of each pipeline stage to an operating system of the PLC. Donating the time slack of each pipeline stage includes generating donor code that includes a set of instructions that free a processor core for a given pipeline stage for a time period identified as the time slack period.

26 Claims, 6 Drawing Sheets

Table 1

|  | Pipeline(4) | Pipeline(4) balanced |
|---|---|---|
| TCP buffer (avg)<br>Std. deviation | 50Kb<br>14Kb | 61Kb<br>727b |
| Stage 1 (CP)<br>Stage 2<br>Stage 3<br>Stage 4 | 34ms<br>33ms<br>29ms<br>30ms | 34ms + 0ms = 34ms<br>33ms + 5ms = 38ms<br>29ms + 9ms = 38ms<br>30ms + 8ms = 38ms |
| Cycle time | 40ms | 40ms |

TIME SLACK APPLICATION PIPELINE BALANCING FOR MULTI/MANY-CORE PLCS

CROSS REFERENCE TO RELATED UNITED STATES APPLICATIONS

This application claims priority from "Time Slack Application Pipeline Balancing for Multi-/Many-Core PLCs", U.S. Provisional Application No. 61/635,355 of Canedo, et al., filed Apr. 19, 2012, the contents of which are herein incorporated by reference in their entirety.

TECHNICAL FIELD

This application is directed to methods for pipeline balancing for multi/many-core programmable logic controllers (PLCs).

DISCUSSION OF THE RELATED ART

Pipelining is a parallel execution technique that allows different iterations of a program to be executed concurrently in multiple processing units, or in multiple processor cores of a multi/many-core processing unit. Pipelining can be successfully applied to PLCs to improve the scan cycle time of user programs.

Pipelining an application requires the processing cores in a multi/many-core processor to be highly utilized even when no useful computation is being performed. This is because stages in a pipeline are typically decoupled through first-in/first-out (FIFO) queues and the consumers (reads or de-queues) are typically implemented with busy-wait loops that consume the available CPU cycles while other threads such as system services are forced to compete for these resources. System services include, but are not limited to, the high-priority communication stack in TCP/IP or Profinet, Human-Machine-Interface (HMI), and alarm/interrupt handlers.

Partitioning a program into N pipeline stages requires an algorithm that performs timing analysis on the user program to calculate appropriate cut-points in the data-flow graph that create N stages that contain roughly the same workload. Pipelining reduces the scan cycle time as the overlap in time of multiple iteration of the program increases the frequency by which inputs and outputs are read/written to the sensors and actuators.

Current systems focus on separating the execution of the user program in N cores, and the system-level threads in the different M cores, where N+M is the total number of available cores in the PLC.

Although pipelining partitioning algorithms create well-balanced stages, the workloads are not identical. This is because these algorithms rely on static timing analysis that does not accurately reflect the run-time variability of execution (branch-prediction, out-of-order execution, memory accesses, etc). The time difference between the short stages and the longest stage, the critical path, are typically filled by busy-waiting loops that waste valuable CPU cycles.

FIG. 1 illustrates how a given user program can be partitioned into three stages A, B, and C that are well-balanced but not identical. Referring now to the figure, the source code 101 of a program is provided as input for the compiler for a programmable logic controller (PLC) 103 such as an IEC 61131-3 PLC, and to a timing analysis program 103. Note that in some embodiments, the timing analysis can be included with the compiler. The output of the compiler 102 and the timing analysis program 103 is then provided as input to a pipelining algorithm 105 that partitions the program, along with the number of stages N 104 into which the program should be partitioned. In this exemplary, non-limiting example, the pipelining algorithm partitions the program into three stages: stage A, stage B, and stage C, in a four core processor. The critical path, Stage C, is 51 ms, while Stage A is 45 ms, and Stage B is 42 ms. This is a difference of 6 ms and 9 ms with respect of the critical path. At run time, Stage A is executed in Core 0, Stage B in Core 1, and Stage C is executed in Core 2. Notice that the system services such as TCP/IP and HMI are allocated to Core 3 and this CPU is time-shared between the two system services. The arrows 109, 110, 112, and 113 represent the inter-processor communication queues, such as, for example, the input to the first stage, Stage A, and by which the output of one stage is provided as input for the next stage. A run-time environment that exploits pipelining has a scan cycle time of 51 ms that is equivalent to the length of the critical path. This is about a 3× reduction on the scan cycle time when compared to the same program executed in a single processor where the scan cycle time is the sum of the execution times of Stages A, B, and C (45 ms+42 ms+51 ms=138 ms)

However, notice that Stage A and Stage B are shorter than the critical path. On each iteration, the shorter stages spend some time in a busy-wait loop 111 that wastes valuable CPU resources. In this particular example, Stage A spends 6 ms per iteration, and Stage B spends 9 ms per iteration.

The phrase "time slack" is used to refer to the time that is wasted on the shorter pipeline stages in a busy-wait loop or similar implementation waiting for the data signal to fire their computation.

The separation of execution in different sets of cores can limit the performance improvements on a PLC by limiting the execution of the user program and the system services to a specific number of cores. This is unfortunate because, in many cases, the user program and the system services can take advantage of using all the cores in the system. In addition, it requires the separation to be performed prior to run-time, at compile-time.

SUMMARY

Exemplary embodiments of the invention as described herein generally include systems and methods for leveraging slack time in unbalanced application pipelines created for multi-/many-core programmable logic controllers (PLCs). Methods according to embodiments of the invention can donate the time slack of an unbalanced pipelined application to system services to improve the overall performance of a multi-/many-core PLC. The slack time in unbalanced pipeline stages is used to improve the overall system performance without affecting the user program's scan cycle time. Because the timing of the critical path is never violated, the user program performs identically in terms of scan cycle time while improving the system services such as communications or HMI. Methods according to embodiments of the invention allow CPU-sharing between user-level threads and system-level threads in such a way that the scan cycle time of the user program remains the same but the system level threads get more CPU time to execute their tasks and therefore improving their performance. The separation of execution of user program and system threads into specific cores can be performed either at compile time or at run-time. Methods according to embodiments of the invention allow a user program to execute at peak-performance in terms of scan cycle time while freeing CPU resources such that system services utilize the freed resources for execution.

According to an aspect of the invention, there is provided a method for performing time-slack pipeline balancing for multi/many-core programmable logic controllers, including calculating a time slack for each of a plurality of pipeline stages in a program for a multi/many-core programmable logic controller (PLC) using a result of a timing analysis of the plurality of stages of the PLC program, for all pipeline stages except a longest stage, donating the time slack of each pipeline stage to an operating system of the PLC, where donating the time slack of each pipeline stage comprises generating donor code that comprises a set of instructions that free a processor core for a given pipeline stage for a time period identified as the time slack period, and emitting machine-executable code for the PLC program According to a further aspect of the invention, the method includes generating by a compiler a low-level intermediate representation of the PLC program, where the timing analysis is performed on the low-level intermediate representation, obtaining the number of pipeline stages, and partitioning the PLC program into the number of pipeline stages, where the time slack of each pipeline stage is calculated.

According to a further aspect of the invention, the method includes creating a plurality of threads corresponding to the plurality of pipeline stages and allocating each pipeline stage to a thread, and assigning each thread to a processor core of the PLC that is dedicated to executing user programs, where the donor code allows the operating system of the PLC to schedule system services to those processor cores of the PLC that have donated time slack, including those cores dedicated to executing user programs.

According to a further aspect of the invention, the donor code for each pipeline stage includes a sleep instruction for the pipeline stage and a timer-triggered message configured to wake the pipeline stage when the time slack expires.

According to a further aspect of the invention, the donor code is inserted between read instructions on an input queue.

According to a further aspect of the invention, calculating a time slack for each of a plurality of pipeline stages uses execution profile data from previous runs of the PLC program.

According to another aspect of the invention, there is provided a method for performing time-slack pipeline balancing for multi/many-core programmable logic controllers, including performing a runtime analysis of a plurality of pipeline stages of a program for a multi/many-core programmable logic controller (PLC) while the program is being executed, and of a plurality of system services, to compile a profile of performance statistics of the PLC program and the system services, calculating a time slack for each of the plurality of pipeline stages of the PLC program using the profile of performance statistics, and for all pipeline stages except a longest stage, donating the time slack of each pipeline stage to an operating system of the PLC, where donating the time slack of each pipeline stage comprises generating donor code that comprises a set of instructions that free a processor core for a given pipeline stage for a time period identified as the time slack period.

According to a further aspect of the invention, calculating a time slack for each of a plurality of pipeline stages uses a result of a compile-time timing analysis of the plurality of stages of the PLC program.

According to a further aspect of the invention, the donor code allows the operating system of the PLC to re-schedule system services to those processor cores of the PLC that have donated time slack, where the pipelines are balanced.

According to a further aspect of the invention, the method includes performing a runtime analysis of the plurality of the balanced pipeline stages of the PLC program.

According to a further aspect of the invention, the method includes loading a machine-executable pipelined PLC program that includes a plurality of threads, scheduling the plurality of threads to processor cores of the multi/many-core PLC that are dedicated to executing user programs, where each pipeline stage is allocated to a thread, and executing the PLC program.

According to a further aspect of the invention, the donor code for each pipeline stage includes a sleep instruction for the pipeline stage and a timer-triggered message configured to wake the pipeline stage when the time slack expires.

According to a further aspect of the invention, the time slack for each of the plurality of pipeline stages is calculated after performance statistics of the PLC program have been obtained for a pre-determined number of execution cycles.

According to another aspect of the invention, there is provided a non-transitory program storage device readable by a computer, tangibly embodying a program of instructions executed by the computer to perform the method steps for performing time-slack pipeline balancing for multi/many-core programmable logic controllers.

DETAILED DESCRIPTION OF EXEMPLARY EMBODIMENTS

Figure 1:
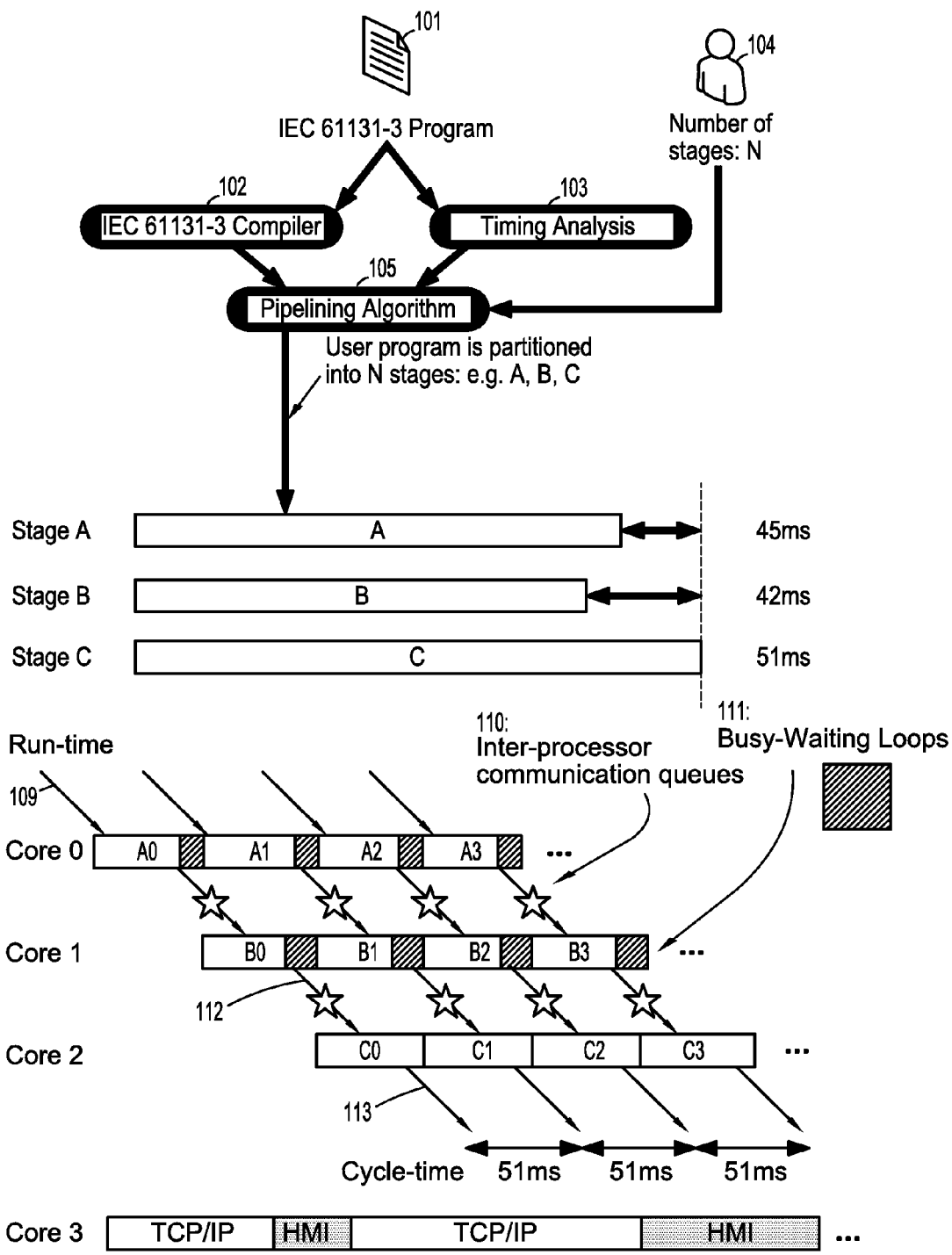
FIG. 1 illustrates how a given user program can be partitioned into three stages A, B, and C that are well-balanced but not identical, according to an embodiment of the invention.

Exemplary embodiments of the invention as described herein generally include systems for pipeline balancing a multi/many-core programmable logic controller, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Embodiments of the invention allow time slack to be utilized by other threads in a system to improve the overall performance of a multi-/many-core PLC while maintaining an identical throughput of a user program, so that a user program does not suffer any performance degradation.

Figure 2:
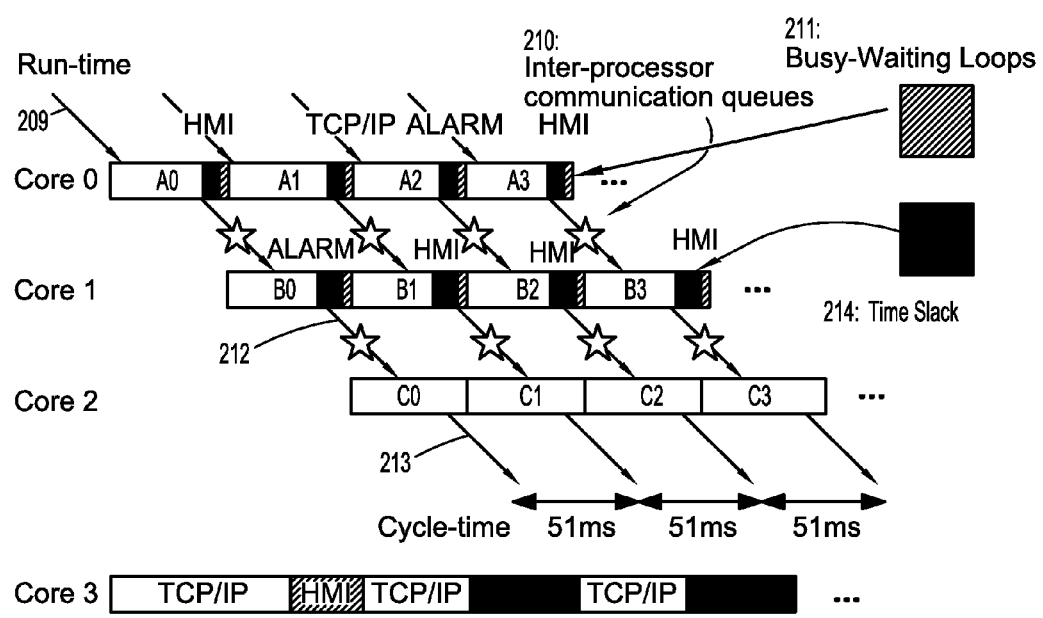
FIG. 2 illustrates how to utilize the time slack of a user pipeline stages to execute system services, according to an embodiment of the invention.

FIG. 2 illustrates how to utilize the time slack of a user pipeline stages to execute system services. Referring now to the figure, where similar reference numbers refer to the same components as in FIG. 1, time slack periods 214 have been carved out of the busy-wait loops 211 after each stage A process and Stage B process, which can then be donates to execute system processes previously executing only in Core 3. A time slack pipeline balancing algorithm according to an embodiment of the invention can free CPU resources from the busy-waiting loops to execute system services threads. Notice that TCP/IP, HMI, and ALARM are executed in cores 0-1 during time slack periods of the pipeline stages and in core 3. Core 2 exclusively executes the critical path and no time slack is exploited to maintain the fastest possible scan cycle time on the critical path of the user application.

Busy-waiting loops can be minimized while time slack is used for useful performance of system services. Because the modified iteration is not allowed to exceed the critical path, methods according to embodiments of the invention can be referred to as "time slack pipeline balancing". The critical path, Stage C, is not modified and it provides the same scan cycle time performance as achieved in the original pipelined version of the program.

In other words, embodiments of the invention donate the time slack of an unbalanced pipelined application to system services to improve the overall performance of a multi/many-core PLC. Because the timing of the critical path is not violated, the user program performs identically in terms of scan cycle time while improving the system services such as communications or HMI.

Time slack balancing can be either performed at compile time or at run-time.

Compile-time time slack balancing uses profile data to accurately estimate the time slack per pipeline stage. This information can be used to generate pipelined stages that have instructions to donate CPU to the system. A detailed algorithm according to an embodiment of the invention is described in FIG. 3. Referring now to the figure, an algorithm begins at step 301 by reading a source program, such as an IEC 61131-3 source program, into the appropriate compiler. The compiler generates a low-level intermediate representation of the program at step 302, using, for example, three-address code. At step 303, the timing analysis routine analyses the intermediate representation of the program and outputs a timing analysis result T to profile data 320. The pipeline partitioning routine obtains the desired number of pipeline stages, N, at step 304, and partitions the program into N pipeline stages at step 305 using the timing analysis results T. Note that in some embodiments, the number of pipeline stages N may be obtained from a use, while in other embodiments, the number of pipeline stages N may be obtained from the compiler based on the number of available cores in the controller. At step 306, N threads are created and assigned to cores dedicated to user program threads, and the N pipeline stages are allocated to the M cores in the system at step 307. At step 308, the operating system or run-time scheduler schedules system service threads to all CPUs, including the CPUs reserved for pipelined execution of the user program. Finally, at step 309, executable code is emitted by the compiler.

According to embodiments of the invention, step 305 can perform compile-time time-slack balancing as follows. At step 311, the time slack for each stage S is calculated using the timing analysis T read from profile data 320, and if available, execution profile data from previous runs of the same application. A loop over all stages starts at step 312. At step 313, it is determined whether the current stage is the critical path. If so, the method skips to step 315, which selects the next stage. Otherwise, at step 314, stage S is balanced by the donation of the slack time to the operating system, after which the next stage is selected at step 315. After step 315, the method processes the next stage from step 312. It is to be understood that the sequence of steps presented in FIG. 3 is exemplary and non-limiting, and the loops can be structured differently in other embodiments, as will be apparent to those of skill in the art.

Run-time time slack balancing gathers sufficient statistics during the execution of a running application to calculate the available time slack per pipeline stage, insert the appropriate donor code, and re-schedule the system services to take advantage of the newly available CPU resources. A detailed algorithm according to an embodiment of the invention is described in FIG. 4. Referring now to the figure, a run-time algorithm according to an embodiment of the invention begins at step 401 by reading a machine executable pipelined IEC 61131-3 program. At step 402, threads are scheduled to CPUs for the user program pipeline stages and the system services. The program cycles are executed at step 403 until it is determined to stop execution at step 404.

According to embodiments of the invention, step 403 can perform run-time time-slack balancing as follows. At step 411, run-time timing analysis is performed on the program stages and system services for a number of execution iterations to compile a profile of performance statistics. At step 412, it is determined whether there have been a sufficient number of iterations for the performance statistics to be useful. In some embodiments, the criteria for a sufficient number of iterations can be predetermined and set by a system designer, while in other embodiments, the criteria can be determined dynamically based on the system status, such as cache information, branch predictors, and thread information provided by the operating system. If so, at step 413, the time slack for each stage S is calculated the timing analysis from the compile stage and the newly acquired performance profile. The slack time from the stages is donated to the system services at step 414, and the system services are re-scheduled to the CPUs donating time slack at step 415. At step 416, additional profile statistics for the balanced stages are generated and saved to the profile data 420.

Figure 3:
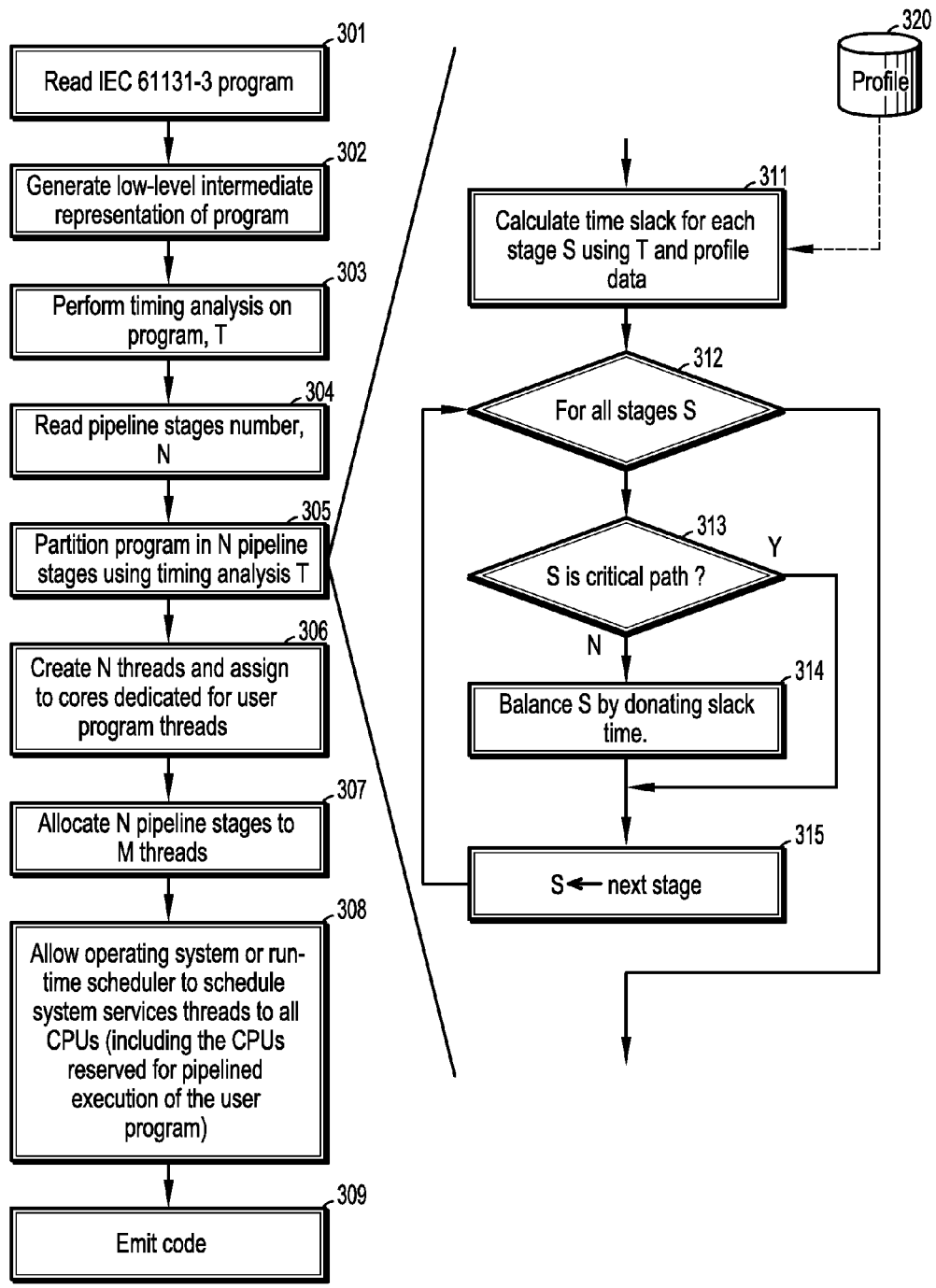
FIG. 3 is a flow chart of a compile-time time slack balancing algorithm using profile data, according to an embodiment of the invention.
Figure 4:
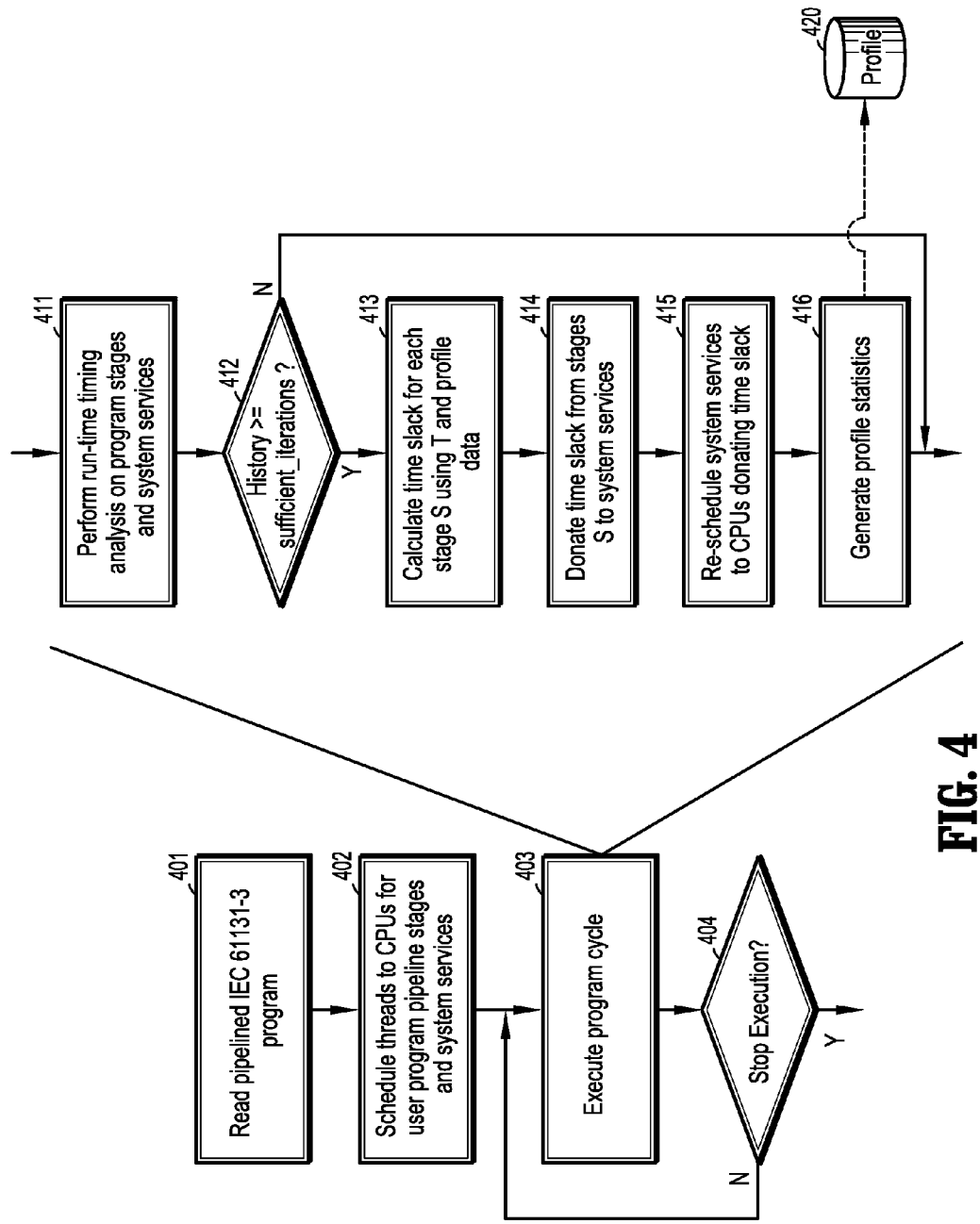
FIG. 4 is a flow chart of a run-time time slack pipeline balancing algorithm that uses run-time information for balancing the pipeline, according to an embodiment of the invention.

FIGS. 3 and 4 show what needs to be changed in an exemplary, non-limiting IEC 61131-3 compiler and the run-time system of a PLC to enable a method according to an embodiment of the invention.

According to an embodiment of the invention, the donation of slack time is accomplished by generating donor code, a set of instructions that free the CPU for the period identified as time slack. Because the synchronization between pipeline stages can be implemented in various ways, the donor code is implementation dependent. However, the functionality of the donor code is to idle the CPU for the calculated time slack. For example, a common pipeline implementation using a busy-waiting loop on FIFO queues could insert the donor code as a sleep instruction between read attempts on the input queue. A pipeline implementation using timers or high-performance counters could insert the donor code as a timer-triggered message that wakes the pipeline stage when the time slack expires.

In general, the PLC system should provide the means for:
Donating time slack.
Reactivating the pipeline stage after the time slack has elapsed.
Guaranteeing that the pipeline stage workload, plus the donor code and the reactivation code, is always less than or equal to the timing in the critical path.

Allocating system services threads to the released resources by the time slack balancing.

FIGS. 5(a)-(c) illustrates the effects of time slack pipeline balancing on TCP/IP stack performance of a PLC system running in a 4-cores processor. The graphs show the TCP window size field included in each TCP header. This field reflects the available buffer size: 0 bytes indicate that the buffer is full and no storage is available, and 65535 bytes indicate an empty buffer and maximum availability. When the TCP thread is busy, incoming packets are stored in the buffer for later processing and therefore the buffer size is reduced.

Pipeline(3) in FIG. 5(a) illustrates the case when 3 cores are used to pipeline a user application and the fourth core is exclusively allocated for the TCP/IP communications. As expected, the window size for the Pipeline(3) program shows that the buffer is kept empty for the whole execution of the program because the TCP thread is running on a dedicated core.

Pipeline(4) in FIG. 5(b) highlights the case when the TCP thread cannot have its own dedicated core. In this case, one core is time-shared between the user program and the TCP thread and this has direct negative impact in the system-level communication performance During Pipeline(4) execution, the buffer is, on average, filled to 23% of its capacity throughout the execution of the program and frequently exceeds 50%. A closer look to the implementation and profile data explains why this occurs. The CPU executing a pipeline stage is maintained occupied trying to de-queue data from the previous stage or I/O with a busy-wait loop.

Embodiments of the invention utilize the imbalance in the pipeline stages to create additional opportunities for the system-level threads to utilize the shared CPUs. Time slack pipeline balancing is performed on the short stages which are normalized to the length of the longest stage by idling the CPUs instead of busy-waiting. These idle periods are utilized to improve the performance of the system-level threads. Pipeline(4) with balanced stages in FIG. 5(c) shows that this technique can improve the performance of a TCP thread that maintains, on average, the buffer filled to within 7% and contained within 30% of its capacity throughout the execution of the program. Note that the scan cycle time remains identical to the original non-balanced version (40 ms) because the balancing affects the small stages and not the critical path.

Figures 5, 6:
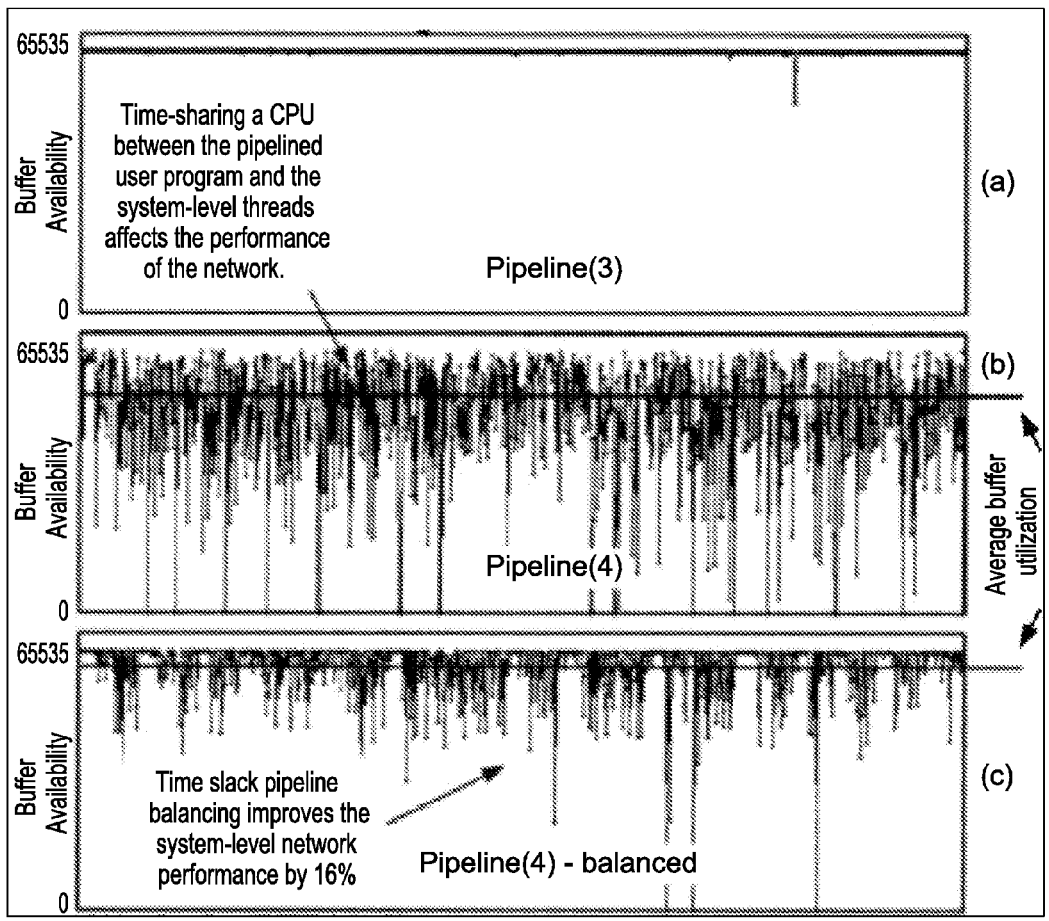
FIG. 5 illustrates the effects of time slack pipeline balancing on TCP/IP stack performance of a PLC system running in a 4-cores processor, according to an embodiment of the invention.
FIG. 6 is a table that shows the effects of time slack pipeline balancing on the TCP performance, according to an embodiment of the invention.

Table 1, shown in FIG. 6, shows the effects of time slack pipeline balancing on the TCP performance in Pipeline(4) for each of 4 stages, before and after time slack pipeline balancing, along with the total scan cycle time. Note that Stage 1, the critical path, is unaffected. Further, note that the balancing of the short pipeline stages to the length of the scan cycle time improves the average TCP buffer availability by 16% and the variability of the buffer utilization is reduced from 14 Kb to only 727 b. Experiments of methods according to embodiments of the invention indicate that a total of 22 ms (5 ms+9 ms+8 ms) of slack time per iteration is leveraged to improve the TCP thread without affecting the scan cycle time.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
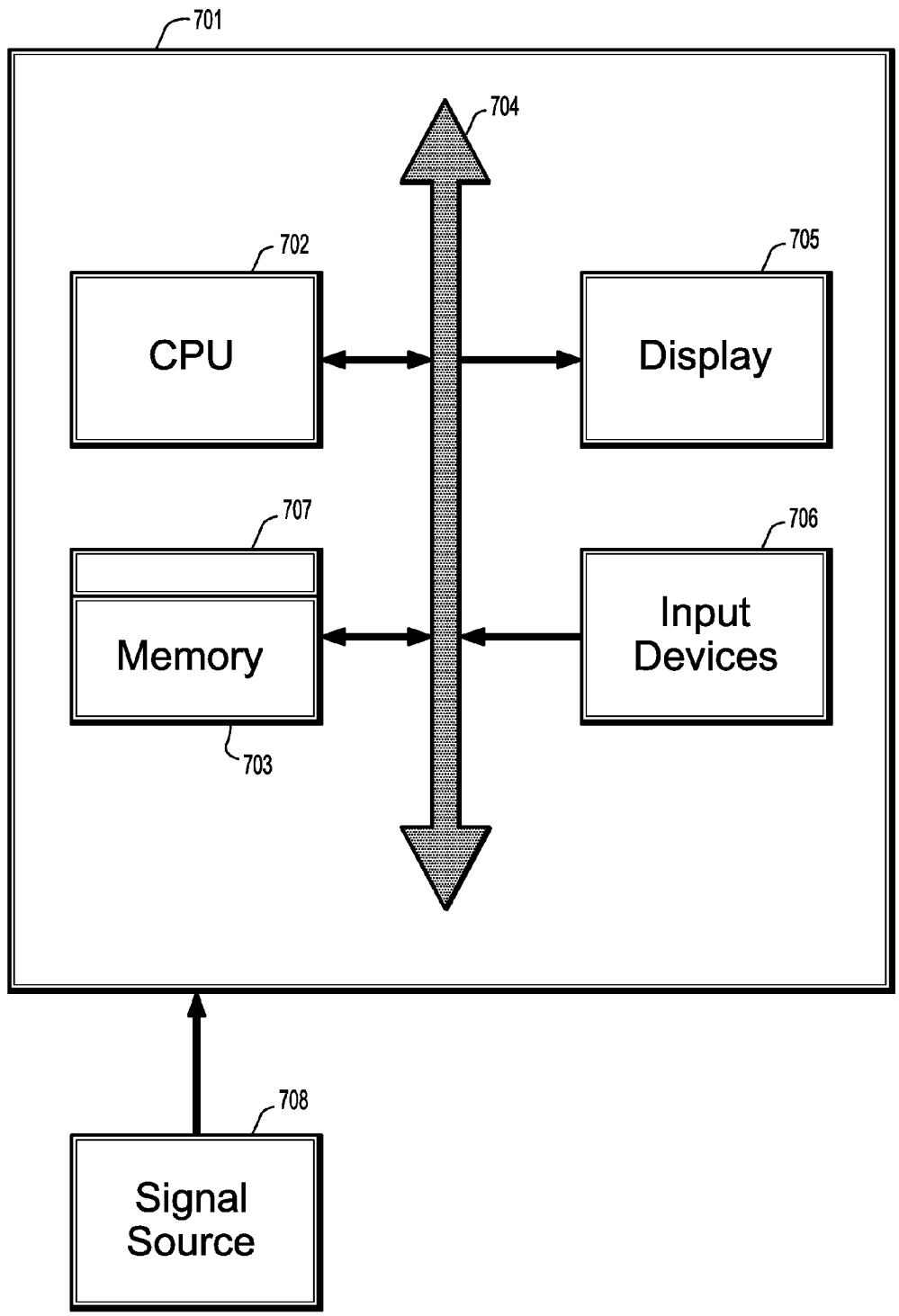
FIG. 7 is a block diagram of an exemplary computer system for implementing a method for pipeline balancing a multi/many-core programmable logic controller, according to an embodiment of the invention.

FIG. 7 is a block diagram of an exemplary computer system for implementing a method for pipeline balancing a multi/many-core programmable logic controller, according to an embodiment of the invention. Referring now to FIG. 7, a computer system 701 for implementing the present invention can comprise, inter alia, a central processing unit (CPU) 702, a memory 703 and an input/output (I/O) interface 704. The computer system 701 is generally coupled through the I/O interface 704 to a display 705 and various input devices 706 such as a mouse and a keyboard. The support circuits can include circuits such as cache, power supplies, clock circuits, and a communication bus. The memory 703 can include random access memory (RAM), read only memory (ROM), disk drive, tape drive, etc., or a combinations thereof. The present invention can be implemented as a routine 707 that is stored in memory 703 and executed by the CPU 702 to process the signal from the signal source 708. As such, the computer system 701 is a general purpose computer system that becomes a specific purpose computer system when executing the routine 707 of the present invention.

The computer system 701 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method for performing time-slack pipeline balancing for multi/many core programmable logic controllers (PLCs), the method comprising:
    calculating a time slack for each of a plurality of pipeline stages in a PLC program for a multi/many-core PLC using a result of a timing analysis of the plurality of pipeline stages of the PLC program;
    for all pipeline stages except one having a longest stage, donating the time slack of each pipeline stage of those pipeline stages to an operating system of the multi/many-core PLC,
    wherein the donating the time slack of each pipeline stage comprises generating donor code that comprises a set of instructions that free a processor core for a given pipeline stage for a time period identified as a period of the time slack; and
    emitting machine-executable code for the PLC program.

2. The method of claim 1, further comprising:
    generating by a compiler a low-level intermediate representation of the PLC program, wherein said timing analysis is performed on the low-level intermediate representation;
    obtaining a number of pipeline stages; and
    partitioning the PLC program into the number of pipeline stages, wherein the time slack of each pipeline stage is calculated.

3. The method of claim 1, further comprising:
- creating a plurality of threads corresponding to the plurality of pipeline stages and allocating each pipeline stage to a thread; and
- assigning each thread to a processor core of the multi/many-core PLC that is dedicated to executing user programs, wherein said donor code allows the operating system of the multi/many-core PLC to schedule system services to those processor cores of the multi/many-core PLC that have donated time slack, including those cores dedicated to executing user programs.

4. The method of claim 1, wherein the donor code for each pipeline stage includes a sleep instruction for the pipeline stage and a timer-triggered message configured to wake the pipeline stage when the time slack expires.

5. The method of claim 4, wherein the donor code is inserted between read instructions on an input queue.

6. The method of claim 1, wherein the calculating the time slack for each of a plurality of pipeline stages uses execution profile data from previous runs of said PLC program.

7. A method for performing time-slack pipeline balancing for multi/many-core programmable logic controllers (PLCs), the method comprising:
- performing a runtime analysis of a plurality of pipeline stages of a PLC program for a multi/many-core PLC while the PLC program is being executed, and of a plurality of system services, to compile a profile of performance statistics of the PLC program and the system services;
- calculating a time slack for each of the plurality of pipeline stages of the PLC program using the profile of performance statistics; and
- for all pipeline stages except one having a longest stage, donating the time slack of each pipeline stage of those pipeline stages to an operating system of the multi/many-core PLC,
- wherein the donating the time slack of each pipeline stage comprises generating donor code that comprises a set of instructions that free a processor core for a given pipeline stage for a time period identified as a period of the time slack.

8. The method of claim 7, wherein the calculating the time slack for each of the plurality of pipeline stages uses a result of a compile-time timing analysis of the plurality of stages of the PLC program.

9. The method of claim 7, wherein said donor code allows the operating system of the multi/many-core PLC to re-schedule system services to those processor cores of the multi/many-core PLC that have the donated time slack, wherein said pipeline stages associated with said operating system are balanced.

10. The method of claim 9, further comprising performing a runtime analysis of the plurality of the balanced pipeline stages of the PLC program.

11. The method of claim 7, further comprising:
- loading a machine-executable pipelined PLC program that includes a plurality of threads;
- scheduling the plurality of threads to processor cores of the multi/many-core PLC that are dedicated to executing user programs, wherein each pipeline stage is allocated to a thread; and
- executing the PLC program.

12. The method of claim 7, wherein the donor code for each pipeline stage includes a sleep instruction for said each pipeline stage and a timer-triggered message configured to wake said each pipeline stage when the time slack associated with said each pipeline stage expires.

13. The method of claim 7, wherein the time slack for each of the plurality of pipeline stages is calculated after performance statistics of the PLC program have been obtained for a pre-determined number of execution cycles.

14. A non-transitory program storage device readable by a computer, tangibly embodying a program of instructions executed by the computer to perform a method for performing time-slack pipeline balancing for multi/many-core programmable logic controllers (PLCs), the method comprising:
- calculating a time slack for each of a plurality of pipeline stages in a PLC program for a multi/many-core PLC using a result of a timing analysis of the plurality of pipeline stages of the PLC program;
- for all pipeline stages except one having a longest stage, donating the time slack of each pipeline stage of those pipeline stages to an operating system of the multi/many-core PLC,
- wherein the donating the time slack of each pipeline stage comprises generating donor code that comprises a set of instructions that free a processor core for a given pipeline stage for a time period identified as a period of the time slack; and
- emitting machine-executable code for the PLC program.

15. The computer readable program storage device of claim 14, the method further comprising:
- generating by a compiler a low-level intermediate representation of the PLC program, wherein said timing analysis is performed on the low-level intermediate representation;
- obtaining a number of pipeline stages; and
- partitioning the PLC program into the number of pipeline stages, wherein the time slack of each pipeline stage is calculated.

16. The computer readable program storage device of claim 14, the method further comprising:
- creating a plurality of threads corresponding to the plurality of pipeline stages and allocating each pipeline stage to a thread; and
- assigning each thread to a processor core of the multi/many-core PLC that is dedicated to executing user programs, wherein said donor code allows the operating system of the multi/many-core PLC to schedule system services to those processor cores of the multi/many-core PLC that have donated time slack, including those cores dedicated to executing user programs.

17. The computer readable program storage device of claim 14, wherein the donor code for each pipeline stage includes a sleep instruction for the pipeline stage and a timer-triggered message configured to wake the pipeline stage when the time slack expires.

18. The computer readable program storage device of claim 17, wherein the donor code is inserted between read instructions on an input queue.

19. The computer readable program storage device of claim 14, wherein the calculating the time slack for each of a plurality of pipeline stages uses execution profile data from previous runs of said PLC program.

20. A non-transitory program storage device readable by a computer, tangibly embodying a program of instructions executed by the computer to perform a method for performing time-slack pipeline balancing for multi/many-core programmable logic controllers (PLCs), the method comprising:
- performing a runtime analysis of a plurality of pipeline stages of a PLC program for a multi/many-core PLC while the PLC program is being executed, and of a plurality of system services, to compile a profile of performance statistics of the PLC program and the system services;

calculating a time slack for each of the plurality of pipeline stages of the PLC program using the profile of performance statistics; and for all pipeline stages except one having a longest stage, donating the time slack of each pipeline stage of those pipeline stages to an operating system of the multi/many-core PLC, wherein the donating the time slack of each pipeline stage comprises generating donor code that comprises a set of instructions that free a processor core for a given pipeline stage for a time period identified as a period of the time slack.

21. The computer readable program storage device of claim 20, wherein the calculating the time slack for each of the plurality of pipeline stages uses a result of a compile-time timing analysis of the plurality of stages of the PLC program.

22. The computer readable program storage device of claim 20, wherein said donor code allows the operating system of the multi/many-core PLC to re-schedule system services to those processor cores of the multi/many-core PLC that have the donated time slack, wherein said pipeline stages associated with said operating system are balanced.

23. The computer readable program storage device of claim 22, the method further comprising performing a runtime analysis of the plurality of the balanced pipeline stages of the PLC program.

24. The computer readable program storage device of claim 20, the method further comprising:

loading a machine-executable pipelined PLC program that includes a plurality of threads;

scheduling the plurality of threads to processor cores of the multi/many-core PLC that are dedicated to executing user programs, wherein each pipeline stage is allocated to a thread; and executing the PLC program.

25. The computer readable program storage device of claim 20, wherein the donor code for each pipeline stage includes a sleep instruction for said each pipeline stage and a timer-triggered message configured to wake said each pipeline stage when the time slack associated with said each pipeline stage expires.

26. The computer readable program storage device of claim 20, wherein the time slack for each of the plurality of pipeline stages is calculated after performance statistics of the PLC program have been obtained for a pre-determined number of execution cycles.

* * * * *